United States Patent Office 3,661,898
Patented May 9, 1972

3,661,898
METALLIFEROUS DYES
Johannes Dehnert and Gerhard Bachmann, Ludwigshafen, Germany, assignors to Badische Anilin- & Soda-Fabrik Aktiengesellschaft, Ludwigshafen (Rhine), Germany
No Drawing. Filed July 23, 1969, Ser. No. 844,210
Claims priority, application Germany, July 24, 1968,
P 17 70 959.0
Int. Cl. C07d 33/50
U.S. Cl. 260—240 G
2 Claims

ABSTRACT OF THE DISCLOSURE

Metalliferous azomethines prepared from 2-(8-aminoquinonyl-(2)-)-indandione-(1,3) and ortho-hydroxyaldehydes which contain copper or nickel as the metal. These compounds are valuable pigment dyes.

---

This invention relates to new metalliferous dyes having the general formula:

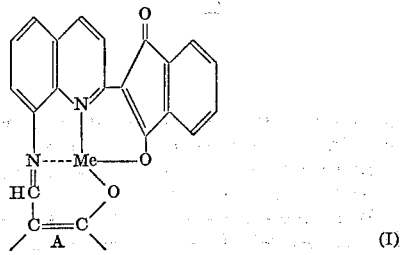
(I)

in which A denotes a divalent radical which may be substituted or unsubstituted but which is devoid of sulfonic acid groups and which completes the >C=C< portion of molecule to form a benzene or naphthalene ring, and Me denotes copper or nickel.

These metal compounds are yellow, red and brown dyes which are outstandingly suitable as pigment dyes because of their insolubility in water and organic solvents, their outstanding light fastness and their exceptional resistance to high temperatures.

The radical A in the Formula I which completes the >C=C< portion of the molecule to form a benzene or naphthalene ring may be substituents, for example halogen atoms, such as chlorine atoms or bromine atoms, nitro groups, alkyl groups such as methyl groups and ethyl groups, alkoxy groups, such as methoxy groups and ethoxy groups, substituted amino groups such as dimethylamino groups, acetylamino groups or benzoylamino groups, carboxyl groups, amide groups, anilide groups, sulfondialkylamide groups and azo groups, but not any sulfonic acid groups.

Dyes having the Formula I are of special industrial interest when they contain, instead of A, one of the radicals:

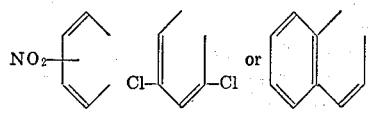

The new dyes may be prepared for example by treating azomethines having the general formula:

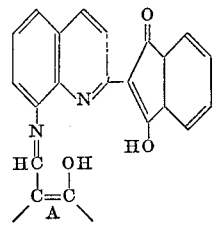
(II)

in which A has the above meaning, if desired simultaneously with their production from ortho-hydroxaldehydes having the general formula:

(III)

and 2-(8-aminoquinolyl-(2))-indandione-(1,3) in a solvent and in the presence or absence of acid-binding agents at temperatures of from 20° to 220° C. with a metallizing agent which yields copper or nickel.

Examples of compounds which may be used as ortho-hydroxyaldehydes having the Formula III for the production of the new dyes are:

2-hydroxybenzaldehyde,
3,6-dichloro-2-hydroxybenzaldehyde,
5-chloro-3-methyl-2-hydroxybenzaldehyde,
5-dimethylamino-2-hydroxybenzaldehyde,
3-nitro-2-hydroxybenzaldehyde,
5-nitro-2-hydroxybenzaldehyde,
2-hydroxynaphthaldehyde-(1),
2-hydroxynaphthaldehyde-(1)-sulfonicdimethylamide-(6),
2-hydroxynaphthaldehyde-(1)-carboxylic acid-(3) and
2-hydroxynaphthaldehyde-(1)-carboxylicanilide-(3).

Examples of agents yielding metal of the abovementioned type are the chlorides, sulfates, nitrates, acetates or formates. They are used in at least stoichiometric amounts.

2-(8-aminoquinolyl-(2))-indandione-(1,3) may be obtained for example from the corresponding 8-nitro compound by reduction or by deacylation of 2-(8-N-phthalimidoquinolyl-(2))-indandione-(1,3) which may be prepared most simply by reaction of 8-aminoquinaldine with at least twice the molar amount of phthalic anhydride.

The new dyes may be prepared for example by reacting an ortho-hydroxyaldehyde of the said type with the stoichiometric amount of 2-(8-aminoquinalyl-(2))-inandione-(1,3) in a solvent, such as water, ethanol, dimethylformamide, N-methylpyrrolidone, glacial acetic acid or 2-methoxy-ethanol, or in a mixture of two or more of these solvents with the agent yielding metal at a temperature of from 20° to 220° C., preferably from 80° to 180° C. It may be advantageous to add acid-binding agents, such as sodium acetate and ammonia, or to use a solvent having a slight acid-binding character, such as dimethylformamide or N-methylpyrrolidone.

Any sequence may be followed in the production of the new dyes, for example by carrying out the reaction of the ortho-hydroxyaldehyde with the 2-(8-aminoqunolyl-(2))-indandione-(1,3) in the said solvents in the absence of the agent yielding metal. Azomethines having the Formula II are thus obtained and may be converted into the metalliferous dyes without intermediate isolation by treatment with the agent yielding metal, advantageously in a solvent, such as dimethylformamide, N-methylpyrrolidone or mixtures of these solvents with water and in the presence or absence of the said acid-binding agents.

The new dyes have high fastness properties of which the excellent light fastness, the exceptional resistance to high temperatures and the very good fastness to solvents may be particularly emphasized. Because of these advantageous properties the new dyes are very suitable as pigment dyes, for example for the production of surface coatings and printing inks as well as for mass coloring thermoplastics, such as polyvinyl chloride, polyamides, polyesters, polyethylene, polypropylene and polystyrene, and as dyes for mass coloration.

The invention is illustrated by the following examples. The parts and percentages specified in the examples are by weight. Parts by volume bear the same relation to parts by weight as the liter to the kilogram.

EXAMPLE 1

12 parts of nitrosalicylaldehyde (a mixture of ortho and para isomers) is added to a solution obtained by heating 18.7 parts of 2-(8-aminoquinolyl-(2))-indandione-(1,3) in 150 parts by volume of dimethylformamide and the reaction mixture is heated under reflux for one hour. and allowed to cool. The azomethine which was crystallized out is washed with a little dimethylformamide and then with methanol and dried. It is a yellow crystal powder which dissolves in N-methylpyrrolidone with a yellowish red color and gives yellow dyeings of high tinctorial strength on polyester fibers.

25 parts of the azomethine thus obtained is dissolved in 500 parts by volume of N-methylpyrrolidone at 200° C. and then a solution of 17 parts of nickel acetate tetrahydrate in 35 parts of water is slowly added. The whole is boiled under reflux for ten minutes, cooled, suction-filtered, washed with a little N-methylpyrrolidone, then with water and dried. A reddish brown pigment dye is obtained having the formula:

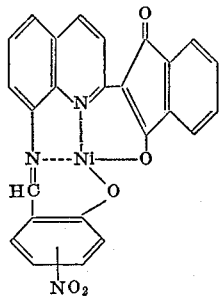

The dye exhibits excellent light fastness in intaglio printing and is insoluble in conventional solvents. It is eminently suitable for mass coloring polyamide in yellowish brown shades because it is stable at 280° C. in the polyamide melt.

EXAMPLE 2

20 parts of the azomethine obtained according to the first paragraph of Example 1 is added to 400 parts by volume of N-methylpyrrolidone and the whole is heated while stirring to 150° C. Then 25 parts by volume of 25% aqueous ammonia solution is added gradually, the starting product thus passing completely into solution. A solution of 14 parts of copper sulfate pentahydrate in 40 parts of water is allowed to flow slowly into this solution and the whole is stirred at the same temperature and then allowed to cool. The isolated copper complex is washed with a little N-methylpyrrolidone, with hot water and then with ethanol and dried. A dye is obtained which is insoluble in most solvents and which gives brownish yellow dyeings having high tinctorial strength and excellent light fastness in intaglio printing. It is eminently suitable for coloring rigid polyvinyl chloride.

EXAMPLE 3

27 parts of 2-(8-aminoquinolyl-(2))-indandione-(1,3) and 23 parts of 2,5-dichlorosalicylaldehyde are heated in 665 parts of glacial acetic acid for one hour under reflux, and allowed to cool. The yellow azomethine is suction-filtered, washed with methanol and dried.

11.5 parts of the azomethine thus obtained is dissolved at 150° C. in 150 parts by volume of N-methylpyrrolidone. A solution of 7.5 parts of nickel acetate tetrahydrate in 20 parts of water is gradually added to this solution and then 10 parts by volume of 50% aqueous sodium acetate solution is gradually added. After stirring for thirty minutes at the same temperature, the reaction product is isolated by suction-filtration and washed with water and ethanol. The reddish brown dye obtained after drying and having the formula:

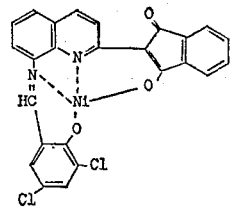

is a pigment for printing having outstanding light and solvent fastness. Its resistance to high temperatures enables it to be incorporated into plastics, such as polyamides, polyesters and polyvinyl chloride.

When the same amount of copper sulfate pentahydrate is used instead of nickel acetate tetrahydrate, the corresponding copper compound is obtained as a yellowish brown pigment having similar properties.

EXAMPLE 4

A nickelliferous dye is prepared according to the procedure of Example 3 from 11 parts of the azomethine (obtained from 27 parts of 2-(8-aminoquinolyl-(2))-indandione-(1,3), 19 parts of 2-hydroxynaphthaldehyde-(1) in 300 parts by volume of glacial acetic acid) and 7.5 parts of nickel acetate tetrahydrate. The brown dye thus obtained exhibits outstanding light and solvent fastness as a print pigment. It is eminently suitable for coloring polyvinyl chloride. The corresponding copper complex prepared with 7.5 parts of copper sulfate pentahydrate instead of nickel acetate tetrahydrate is a brown pigment having similar tinctorial properties to those of the nickelliferous dye obtained as described above.

EXAMPLE 5

26.5 parts of 2-(8-aminoquinolyl-(2))-indandione-(1, 3) in 300 parts by volume of glacial acetic acid is boiled under reflux while stirring and 14 parts of solicylaldehyde is added. The whole is stirred for an hour at the same temperature, allowed to cool and the yellow reaction product is suction-filtered, washed with water and a little methanol and dried. A yellow powder is obtained which gives yellow dyeings having high tinctorial strength on polyester and polyamide cloth.

A solution of 5.5 parts of nickel acetate tetrahydrate in 15 parts of water is added at 100° C. to the solution of 7 parts of the azomethine thus obtained and after thirty minutes the whole is gradually diluted with water. The metalliferous brown dye which is isolated after cooling is washed with water and dried. It is a reddish brown powder and gives in intaglio printing reddish brown shades having excellent light fastness and very good solvent fastness. The dye has the formula:

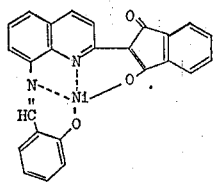

EXAMPLE 6

A solution of 7.5 parts of copper sulfate pentahydrate in 10 parts of water is gradually added to a solution of 10 parts of the azomethine obtained from 2-(8-aminoquinolyl-(2)-indandione-(1,3) and salicylaldehyde in 100 parts by volume of N-methylpyrrolidone according to Example 5 at 150° C. and then 10 parts by volume of a 50% aqueous sodium acetate solution is added. After stirring for twenty minutes at the same temperature, the whole is allowed to cool and the brown copper complex is suction-filtered, washed with water and dried. The dye which is a brown powder, gives pigment colorations having outstanding light fastness and very good solvent fastness.

EXAMPLE 7

11 parts of the azomethine from 4'-nitro-4-hydroxyazobenzene - 2 - aldehyde and 2 - (8-aminoquinolyl-(2))-indandione-(1,3) is dissolved in 200 parts by volume of N-methylpyrrolidone with an addition of 10 parts by volume of 25% aqueous ammonia solution. A solution of 6 parts of nickel chloride hexahydrate in 15 parts of N-methylpyrrolidone is dripped into this solution gradually and the whole is stirred for two hours at 100° C. The nickelliferous reaction product is suction-filtered while hot, washed with a little N-methylpyrrolidone, then with ethanol and water and dried. The dye having the formula:

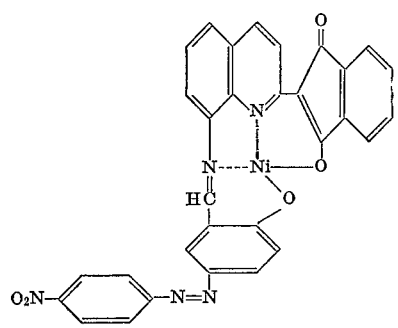

is obtained as a brown powder having outstanding light fastness and solvent fastness as a pigment.

EXAMPLE 8

The procedure of Example 7 is followed but 7.5 parts of copper sulfate pentahydrate is used instead of 6 parts of nickel chloride hexahydrate. The corresponding copper complex is obtained as a brown pigment having similar properties.

EXAMPLE 9

A solution of 14 parts of nickel acetate tetrahydrate in 40 parts of water is gradually added to a solution of 14 parts of 2-(8-aminoquinolyl-(2))-indandione-(1,3) in 100 parts by volume of N-methylpyrrolidone at 100° C. The reaction mixture is heated to 150° C. and 10 parts of 3,5-dichloro-2-hydroxybenzaldehyde is added in small portions at this temperature. The whole is kept at 150° C. for another three hours while stirring and the reaction product is suction-filtered after cooling. The residue is washed with dimethylformamide, washed with water and alcohol and dried at 100° C. A brown dye is obtained whose properties are identical to those of the dye of Example 3.

EXAMPLE 10

10 parts of 3,5-dichloro-2-hydroxybenzaldehyde is introduced in small portions into a solution, heated to 150° C. to 14 parts of 2 - (8 - aminoquinolyl - (2))-indandione-(1,3) in 100 parts by volume of N-methylpyrrolidone. At the same temperature a solution of 13 parts of nickel chloride hexahydrate in 40 parts by volume of N-methylpyrrolidone is added to the reaction mixture followed by 30 parts by volume of 50% aqueous sodium acetate solution. After stirring for two hours at 150° C., the reaction product is isolated at room temperature, washed with dimethylformamide, water and alcohol and dried at 100° C. A dye is obtained which is identical with the dyes obtained according to Example 3 and Example 9.

EXAMPLE 11

A solution of 6.5 parts of nickel actate tetrahydrate in 20 parts of water is added in portions at 120° C. to a mixture of 50 parts of N-methylpyrrolidone and 14 parts of the azomethine obtainable from 29 parts of 2-(8-aminoquinolyl-(2))-indandione-(1,3) and 33 parts of the diazo compound prepared from equimolar amounts of 4-aminoazobenzene and salicylaldehyde. After stirring for three hours at 120° C. the product is suction-filtered while hot, washed first with N-methylpyrrolidone, then with ethanol and finally with water and dried. The dye having the formula:

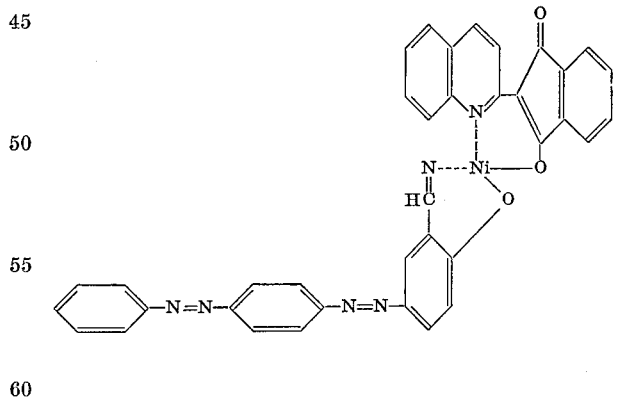

is obtained in the form of a brown powder. The dye gives brown dyeing having outstanding fastness properties in intaglio printing and on polyvinyl chloride.

EXAMPLE 12

The procedure of Example 11 is followed, but 6.5 parts of copper sulfate tetrahydrate and 20 parts of a 50% aqueous sodium acetate solution are used instead of nickel acetate. The corresponding complex compound is obtained as a brown pigment having outstanding tinctorial properties.

We claim:
1. A metalliferous dye having the formula
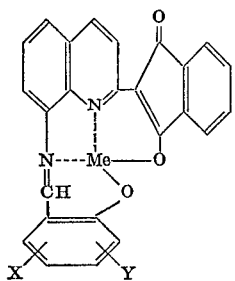 or 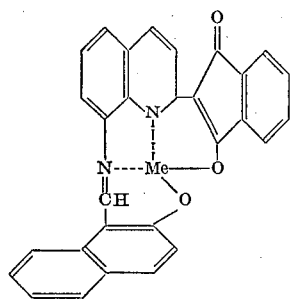
wherein:
X is hydrogen, chlorine, nitro, p-nitrophenylazo or p-(phenylazo)-phenylazo,
Y is hydrogen or chlorine, and
Me is copper or nickel.
2. The dye having the formula:
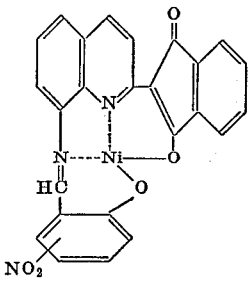
References Cited
UNITED STATES PATENTS
2,795,582  6/1957  Bauer _____ 260—289 X
3,389,132  6/1968  Dressler _____ 260—240 G
DONALD G. DAUS, Primary Examiner
U.S. Cl. X.R.
106—2880; 260—145 B, 155, 288 Q, 289 QP, 599

PO-1050
(5/69)

UNITED STATES PATENT OFFICE
CERTIFICATE OF CORRECTION

Patent No. 3,661,898            Dated May 9, 1972

Inventor(s) Johannes Dehnert and Gerhard Bachmann

It is certified that error appears in the above-identified patent and that said Letters Patent are hereby corrected as shown below:

Column 1, line 52, "be" should read -- bear --.

Column 2, line 63, "2-(8-aminoqunolyl" should read -- 2-(8-aminoquinolyl --.

Column 4, line 62, "solicylaldehyde" should read -- salicylaldehyde --.

Column 5, line 19, "quinolyl-(2)-indandione-(1,3)" should read -- quinolyl-(2))-indandione-(1,3) --.

Column 6, line 16, "150° C. to 14" should read -- 150° C., of 14 --
line 30, "actate" should read -- acetate --.

Signed and sealed this 28th day of November 1972.

(SEAL)
Attest:

EDWARD M. FLETCHER, JR.
Attesting Officer

ROBERT GOTTSCHALK
Commissioner of Patents